US012012100B2

(12) United States Patent
Masutani et al.

(10) Patent No.: US 12,012,100 B2
(45) Date of Patent: Jun. 18, 2024

(54) DRIVING SUPPORT DEVICE, DRIVING SUPPORT METHOD, AND STORAGE MEDIUM

(71) Applicant: HONDA MOTOR CO., LTD., Tokyo (JP)

(72) Inventors: Tomo Masutani, Tokyo (JP); Makoto Aimura, Tokyo (JP); Naoya Iizumi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 270 days.

(21) Appl. No.: 17/678,082

(22) Filed: Feb. 23, 2022

(65) Prior Publication Data

US 2022/0314997 A1 Oct. 6, 2022

(30) Foreign Application Priority Data

Mar. 30, 2021 (JP) .................................. 2021-058123

(51) Int. Cl.
*B60W 30/18* (2012.01)
*B60W 10/18* (2012.01)
(Continued)

(52) U.S. Cl.
CPC ...... *B60W 30/18109* (2013.01); *B60W 10/18* (2013.01); *B60W 30/09* (2013.01);
(Continued)

(58) Field of Classification Search
CPC ........... B60W 30/18109; B60W 30/09; B60W 10/18; B60W 40/04; B60W 40/06;
(Continued)

(56) References Cited

U.S. PATENT DOCUMENTS

| 4,401,181 A | 8/1983 | Schwarz |
| 2005/0125121 A1 | 6/2005 | Isaji et al. |

(Continued)

FOREIGN PATENT DOCUMENTS

| CN | 1812901 | 8/2006 |
| CN | 102859567 | 1/2013 |

(Continued)

OTHER PUBLICATIONS

Japanese Office Action for Japanese Patent Application No. 2021-058123 dated Dec. 13, 2022.
(Continued)

*Primary Examiner* — Hai H Huynh
(74) *Attorney, Agent, or Firm* — Amin, Turocy & Watson, LLP (57) ABSTRACT

A driving support device includes a storage device storing a program and a hardware processor. The hardware processor executes the program stored in the storage device to perform driving support of a vehicle based on a detection result of at least one of a radar device and an imaging device mounted in the vehicle, determine whether the vehicle is traveling in an underpass which is a traffic route along which the vehicle is able to pass under an overlying structure, and suppress an operation of the driving support when the vehicle is determined to be traveling under the underpass.

9 Claims, 6 Drawing Sheets

(51) Int. Cl.
  *B60W 30/09* (2012.01)
  *B60W 40/04* (2006.01)
  *B60W 40/06* (2012.01)
  *G01S 13/86* (2006.01)
  *G01S 13/89* (2006.01)
  *G01S 13/931* (2020.01)
  *G06V 20/56* (2022.01)
  *G06V 20/58* (2022.01)

(52) U.S. Cl.
  CPC ............ *B60W 40/04* (2013.01); *B60W 40/06* (2013.01); *G01S 13/867* (2013.01); *G01S 13/89* (2013.01); *G01S 13/931* (2013.01); *G06V 20/58* (2022.01); *G06V 20/588* (2022.01); *B60W 2420/403* (2013.01); *B60W 2420/408* (2024.01); *B60W 2556/40* (2020.02); *G01S 2013/93185* (2020.01); *G01S 2013/9322* (2020.01)

(58) Field of Classification Search
  CPC ..... B60W 2420/403; B60W 2420/408; B60W 2556/40; B60W 2552/15; B60W 2552/53; B60W 2554/20; G01S 13/867; G01S 13/89; G01S 13/931; G01S 13/34; G01S 13/86; G01S 13/42; G01S 2013/93185; G01S 2013/9322; G01S 7/411; G06V 20/58; G06V 20/588; B60K 31/00
  USPC .......................................................... 701/70
  See application file for complete search history.

(56) References Cited

U.S. PATENT DOCUMENTS

| | | |
|---|---|---|
| 2006/0155469 A1 | 7/2006 | Kawasaki |
| 2010/0185390 A1 | 7/2010 | Monde et al. |
| 2012/0083964 A1 | 4/2012 | Montemerlo et al. |
| 2013/0044218 A1 | 2/2013 | Matsuda et al. |
| 2014/0285667 A1 | 9/2014 | Aimura |
| 2018/0001887 A1 | 1/2018 | Watanabe et al. |
| 2019/0061811 A1 | 2/2019 | Odate |
| 2019/0071099 A1 | 3/2019 | Nishiguchi |
| 2019/0080611 A1 | 3/2019 | Yamada et al. |
| 2019/0096258 A1 | 3/2019 | Ide et al. |
| 2019/0202473 A1 | 7/2019 | Kaji et al. |
| 2019/0300053 A1 | 10/2019 | Mizoguchi |
| 2020/0279487 A1 | 9/2020 | Toda et al. |
| 2020/0369274 A1 | 11/2020 | Mizuno et al. |

FOREIGN PATENT DOCUMENTS

| | | | | |
|---|---|---|---|---|
| CN | 103339010 | | 10/2013 | |
| CN | 103946907 | | 7/2014 | |
| CN | 107554523 | | 1/2018 | |
| CN | 109421710 | | 3/2019 | |
| CN | 109421794 | | 3/2019 | |
| CN | 109472975 | | 3/2019 | |
| CN | 109591593 | | 4/2019 | |
| CN | 109987099 | | 7/2019 | |
| CN | 111095380 | | 5/2020 | |
| CN | 111731256 | | 10/2020 | |
| DE | 102013012314 | * | 1/2015 | ............. G01B 11/02 |
| FR | 2883826 | | 10/2006 | |
| JP | 2001-195684 | | 7/2001 | |
| JP | 2004-355266 | | 12/2004 | |
| JP | 2005-258696 | | 9/2005 | |
| JP | 2007-171154 | | 7/2007 | |
| JP | 2008-007062 | | 1/2008 | |
| JP | 2008-049925 | | 3/2008 | |
| JP | 2010-231561 | | 10/2010 | |
| JP | 2011-103058 | | 5/2011 | |
| JP | 2015-225531 | | 12/2015 | |
| JP | 2017-034889 | | 2/2017 | |
| JP | 2018-043576 | | 3/2018 | |
| JP | 2019-015999 | | 1/2019 | |
| JP | 2019-137316 | | 8/2019 | |
| JP | 2019-144556 | | 8/2019 | |
| JP | 2019-152894 | | 9/2019 | |
| JP | 2019-156267 | | 9/2019 | |
| JP | 2019-158778 | | 9/2019 | |
| KR | 2277753 | * | 7/2021 | ............. G08B 21/10 |
| KR | 102277753 | * | 7/2021 | ............. G08B 21/10 |
| WO | 2009/004749 | | 1/2009 | |
| WO | WO 2019159647 | * | 8/2019 | ........... G01S 13/931 |

OTHER PUBLICATIONS

Chinese Office Action for Chinese Patent Application No. 202210164418.0 mailed Mar. 7, 2024.

* cited by examiner

DRIVING SUPPORT DEVICE, DRIVING SUPPORT METHOD, AND STORAGE MEDIUM

CROSS-REFERENCE TO RELATED APPLICATION

Priority is claimed on Japanese Patent Application No. 2021-058123, filed Mar. 30, 2021, the content of which is incorporated herein by reference.

BACKGROUND

Field of the Invention

The present invention relates to a driving support device, a driving support method, and a storage medium.

Description of Related Art

Technologies for mitigating erroneous recognition by external recognition devices mounted in vehicles are known. For example, Japanese Unexamined Patent Application, First Publication No. 2008-007062 discloses a technology in which a preceding vehicle recognition ECU sets, as preceding vehicle candidates, objects which are stationary objects detected by a millimetric wave radar only when vehicle speeds detected by a vehicle speed sensor are less than a threshold.

SUMMARY

The technology disclosed in Japanese Unexamined Patent Application, First Publication No. 2008-007062 is a technology for mitigating erroneous recognition of an object when a target followed by a vehicle is selected. In the technology of the related art, however, for example, an operation of driving support based on erroneous recognition of an object when a vehicle is traveling in an underpass which is a traffic route along which the vehicle is able to pass under an overlying structure may not be reduced in some cases.

The present invention is devised in view of such circumstances and an objective of the present invention is to provide a driving support device, a driving support method, and a storage medium capable of mitigating an operation of driving support based on erroneous recognition of an object when a vehicle is traveling in an underpass which is a traffic route along which the vehicle is able to pass under an overlying structure.

A driving support device, a driving support method, and a storage medium according to the present invention adopt the following configurations.

(1) According to an aspect of the present invention, a driving support device includes a storage device storing a program and a hardware processor. The hardware processor executes the program stored in the storage device to perform driving support of a vehicle based on a detection result of at least one of a radar device and an imaging device mounted in the vehicle, to determine whether the vehicle is traveling in an underpass which is a traffic route along which the vehicle is able to pass under an overlying structure, and to suppress an operation of the driving support when the vehicle is determined to be traveling under the underpass.

(2) In the driving support device according to the aspect (1), based on a detection result of at least one of the radar device and the imaging device, the hardware processor may determine whether the vehicle is traveling in the underpass.

(3) In the driving support device according to the aspect (2), the hardware processor may determine that the vehicle is traveling in the underpass when a condition that at least one of the radar device and the imaging device detects left and right walls in a traveling direction of the vehicle is satisfied.

(4) In the driving support device according to the aspect (2), the hardware processor may determine that the vehicle is traveling in the underpass when a condition that at least one of the radar device and the imaging device detects an uphill section in a traveling direction of the vehicle is satisfied.

(5) In the driving support device according to the aspect (1), based on map information and positional information of the vehicle, the hardware processor may determine whether the vehicle is not traveling in the underpass.

(6) In the driving support device according to the aspect (1), the hardware processor may estimate a size of an object based on a detection result of the radar device when the hardware processor determines that the vehicle is traveling in the underpass and the imaging device detects the object, and the hardware processor does not operate the driving support when the size is equal to or less than a predetermined value.

(7) In the driving support device according to the aspect (1), when the hardware processor determines that the vehicle is traveling in the underpass and an object detected by the imaging device is not a vehicle, the hardware processor may not operate the driving support.

(8) According to another aspect of the present invention, a driving support method is a method of causing a computer mounted in a vehicle: to perform driving support of a vehicle based on a detection result of at least one of a radar device and an imaging device mounted in the vehicle, to determine whether the vehicle is traveling in an underpass which is a traffic route along which the vehicle is able to pass under an overlying structure, and to suppress an operation of the driving support when the vehicle is determined to be traveling under the underpass.

(9) According to still another aspect of the present invention, a computer-readable non-transitory storage medium stores a program causing a computer mounted in a vehicle: to perform driving support of a vehicle based on a detection result of at least one of a radar device and an imaging device mounted in the vehicle, to determine whether the vehicle is traveling in an underpass which is a traffic route along which the vehicle is able to pass under an overlying structure, and to suppress an operation of the driving support when the vehicle is determined to be traveling under the underpass.

According to (1) to (9), it is possible to reduce an operation of driving support based on erroneous recognition of an object when a vehicle is traveling in an underpass which is a traffic route along which the vehicle is able to pass under an overlying structure.

DETAILED DESCRIPTION

Hereinafter, embodiments of a driving support device, a driving support method, and a storage medium according to the present invention will be described with reference to the drawings.

Configuration

Figure 1:
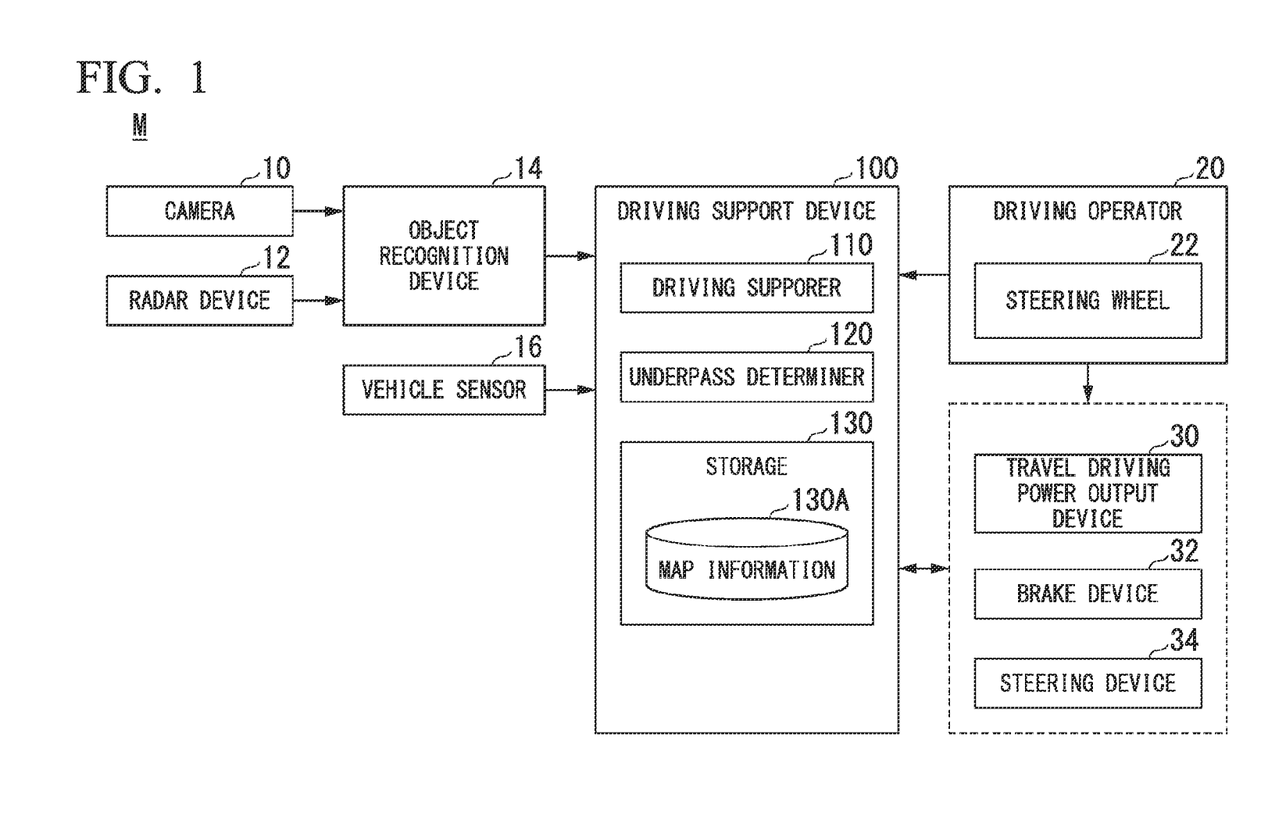
FIG. 1 is a diagram illustrating an exemplary configuration of a driving support device mounted on an own vehicle.

FIG. 1 is a diagram illustrating an exemplary configuration of a driving support device 100 mounted on an own vehicle M. The own vehicle M includes, for example, a camera 10, a radar device 12, an object recognition device 14, a vehicle sensor 16, a driving operator 20, a steering wheel 22, a travel driving power output device 30, a brake device 32, a steering device 34, and a driving support device 100.

The camera 10 is, for example, a digital camera that uses a solid-state image sensor such as a charge coupled device (CCD) or a complementary metal oxide semiconductor (CMOS). The camera 10 is mounted on any portion of a vehicle (hereinafter referred to as an own vehicle M) in which a vehicle system 1 is mounted. When the camera 10 images a front side, the camera 10 is mounted on an upper portion of a front windshield, a rear surface of a rearview mirror, or the like. For example, the camera 10 repeatedly images the surroundings of the own vehicle M periodically. The camera 10 may be a stereo camera. The camera 10 transmits a captured image to the object recognition device 14. The camera 10 is an example of an "imaging device."

The radar device 12 radiates radio waves such as millimeter waves to the surroundings of the own vehicle M and detects radio waves (reflected waves) reflected from a surrounding object to detect at least a position (a distance from and an azimuth) of the object. The radar device 12 is mounted on any portion of the own vehicle M. The radar device 12 may detect a position and a speed of an object in conformity with a frequency modulated continuous wave (FM-CW) scheme. The radar device 12 transmits detection results to the object recognition device 14.

The object recognition device 14 performs sensor fusion processing on the detection results obtained by one or both of the camera 10 and the radar device 12 and recognizes positions, kinds, speeds, and the like of objects. The object recognition device 14 detects pedestrians, other vehicles, road structures (road marking lines, walls, or the like), and the like shown in images received from the camera 10 by performing image processing on the images. The object recognition device 14 detects pedestrians, other vehicles, road structures (road marking lines, walls, or the like), and the like near the own vehicle M based on detection results received from the radar device 12. The object recognition device 14 transmits the detection results to the driving support device 100. The object recognition device 14 may be configured with only the camera 10 and may recognize positions, kinds, speeds, and the like of objects by performing image processing on images received from the camera 10.

The vehicle sensor 16 includes a vehicle speed sensor that detects a speed of the own vehicle M, an acceleration sensor that detects acceleration, a yaw rate sensor that detects an angular velocity around a vertical axis, and an azimuth sensor that detects a direction of the own vehicle M.

The driving operator 20 includes, for example, an accelerator pedal, a brake pedal, a shift level, or other operators apart from the steering wheel 22. A sensor that detects a manipulation amount or whether a manipulation is performed is mounted on the driving operator 20, and a detection result is output to some or all of the driving support device 100, the travel driving power output device 30, the brake device 32, and the steering device 34. The operator may not necessarily be a ring shape and may be a heteromorphic steering wheel, a joystick, a button, or the like.

The travel driving power output device 30 outputs a travel driving power (torque) for traveling the own vehicle M to a driving wheel. The travel driving power output device 30 includes, for example, a combination of an internal combustion engine, an electric motor, and a transmission and an electronic control unit (ECU) controlling them. The ECU controls the foregoing configuration in accordance with information input from the driving support device 100 or information input from the driving operator 20.

The brake device 32 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the driving support device 100 or information input from the driving operator 20 such that a brake torque in accordance with a braking operation is output to each wheel. The brake device 32 may include, as a backup, a mechanism that transmits a hydraulic pressure generated in response to a manipulation of the brake pedal included in the driving operator 20 to the cylinder via a master cylinder. The brake device 32 is not limited to the above-described configuration and may be an electronic control type hydraulic brake device that controls an actuator in accordance with information input from the driving support device 100 such that a hydraulic pressure of the master cylinder is transmitted to the cylinder.

The steering device 34 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the driving support device 100 or information input from the driving operator 20.

The driving support device 100 includes, for example, a driving support unit 110, an underpass determination unit 120, and a storage unit 130. The driving support unit 110 and the underpass determination unit 120 are implemented, for example, by causing a hardware processor such as a central processing unit (CPU) to execute a program (software). Some or all of the constituent elements may be implemented by hardware (a circuit unit including circuitry) such as a large scale integration (LSI), an application specific integrated circuit (ASIC), a field-programmable gate array (FPGA), or a graphics processing unit (GPU) or may be implemented by software and hardware in cooperation. The program may be stored in advance in a storage device (a storage device including a non-transitory storage medium) such as an HDD or a flash memory of the driving support device 100 or may be stored in a detachably mounted storage medium such as a DVD or a CD-ROM so that the storage medium (a non-transitory storage medium) is mounted on a drive device to be installed on the HDD or the flash memory of the driving support device 100. The storage unit 130 is implemented by, for example, a read-only memory (ROM), a flash memory, an SD card, a random access memory (RAM), a register, or the like.

The driving support unit 110 performs driving support of the own vehicle M based on a detection result of at least one of the camera 10 and the radar device 12. In the embodiment, "driving support" refers to collision damage reduction braking (autonomous emergency braking (AEB)) performed to operate the brake device 32 automatically to avoid collision with an obstacle which is in a traveling direction of the own vehicle M or reduce a collision speed. More specifically, the driving support unit 110 determines whether an obstacle such as a pedestrian or another vehicle is in a traveling direction of the own vehicle M based on a detection result of at least one of the camera 10 and the radar device 12. When it is determined that the obstacle is in the traveling direction of the own vehicle M, a spare collision time (time to collision (TTC)) which is a time until collision of the own vehicle M with the obstacle is calculated based on information (for example, a relative distance or a relative speed to the obstacle) acquired from the camera 10, the radar device 12, and the vehicle sensor 16. When the spare collision time is less than a threshold, the driving support is operated.

The underpass determination unit 120 determines whether the own vehicle M is traveling in an underpass which is a traffic route configured so that the own vehicle M is able to pass under an overlying structure. In this case, the traffic route is a route along which a mobile object generally travels, such as a lane in which an automobile travels or a railroad in which a train travels. The driving support unit 110 suppresses an operation of the driving support when the underpass determination unit 120 determines that the own vehicle M is traveling in an underpass. In this case, "suppress" means that a condition in which stricter restrictions are imposed during operating of the driving support. A specific method of determining an underpass and an operation condition of the driving support in a case in which a vehicle travels in an underpass will be described below.

The storage unit 130 stores map information 130A. The map information 130A is, for example, information in which road shapes are expressed with links indicating roads and nodes connected by the links, and includes road information, traffic regulation information, address information (address and postal number), facility information, and telephone number information as subsidiary information. Based on a position of the own vehicle M specified by a GNN receiver (not illustrated) mounted in the own vehicle M, the driving support unit 110 can acquire the foregoing information regarding the position of the own vehicle M with reference to the map information 130A.

Operation of Driving Support Device 100

Figure 2:
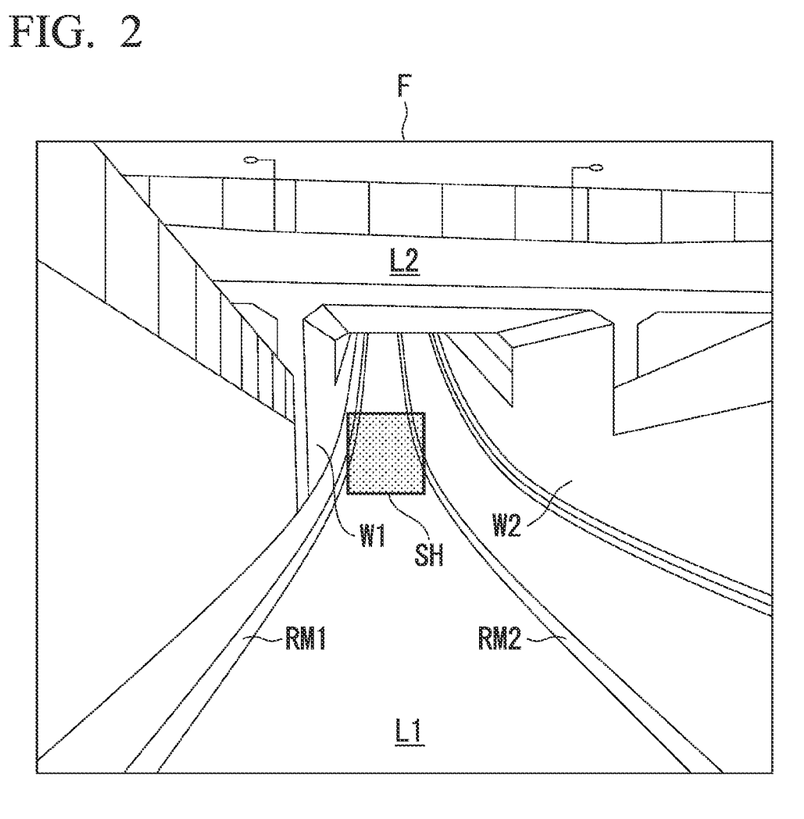
FIG. 2 is a diagram illustrating an example of a scenario in which an operation of the driving support device is performed.

Next, an operation of the driving support device 100 according to the embodiment will be described with reference to FIGS. 2 to 4. FIG. 2 is a diagram illustrating an example of a scenario in which an operation of the driving support device 100 is performed. FIG. 2 illustrates an aspect in which the own vehicle M is traveling in a lane L1 and an occupant of the own vehicle M is able to perform visual recognition in the outside world through a front windshield F. In FIG. 2, the lane L1 and a lane L2 intersect each other. A lower traffic route between two traffic routes which the lane L1 intersects is an underpass and the lane L2 is an upper traffic route. W1 indicates a left wall of a structure supporting the lane L2. W2 indicates a right wall of the structure supporting the lane L2. RM1 indicates a left road marking line of the lane L1 and RM2 indicates a right road marking line of the lane L1 (hereinafter, when the left road marking line RM1 and the right road marking line RM2 are not distinguished from each other, the road marking lines RM1 and RM2 are collectively referred to "road marking lines RM"). SH indicates a shadow formed when the lane L2 is present above the lane L1. The lane L1 may not be a traffic route and may be a structure other than a traffic route.

As a comparative example, in general, when a vehicle that has the AEB function is traveling in an underpass, the camera or the radar device erroneously detects the shadow SH of FIG. 2 as another vehicle or a pedestrian and the AEB function may be activated in some cases. As a result, even though there another vehicle or a pedestrian is not in the traveling direction of the vehicle, the vehicle may be braked, and thus the occupant may experience a discomfort in some cases.

Thus, based on a detection result obtained from at least one of the camera 10 and the radar device 12, the underpass determination unit 120 determines whether the own vehicle M is traveling in the underpass. When the own vehicle M is determined to be traveling in the underpass, the driving support unit 110 suppresses an operation of the driving support. Specifically, the underpass determination unit 120 determines whether the own vehicle M is traveling in the underpass in accordance with the following method.

First Determination Method for Underpass

As a first determination method for an underpass, the underpass determination unit 120 determines that the own vehicle M is traveling in an underpass when at least one of the camera 10 and the radar device 12 detects left and right walls in the traveling direction of the own vehicle M. Specifically, for example, when the object recognition device 14 detects left and right walls in the traveling direction of the own vehicle M by performing image processing on an image acquired from the camera 10, the underpass determination unit 120 determines that the own vehicle M is traveling in the underpass. For example, the object recognition device 14 may generate a reflection intensity distribution based on a reflection intensity of radio waves acquired from the radar device 12. When forms of dot groups in the reflection intensity distribution indicate walls, the underpass determination unit 120 determines that the own vehicle M is traveling in the underpass.

Second Determination Method for Underpass

As a second determination method for an underpass, the underpass determination unit 120 determines that the own vehicle M is traveling in the underpass when at least one of the camera 10 and the radar device 12 detects an uphill section in the traveling direction of the own vehicle M. Specifically, for example, when the left road marking line RM1 and the right road marking line RM2 captured by the camera 10 indicate an uphill section, the underpass determination unit 120 determines that the own vehicle M is traveling in the underpass.

Figure 3:
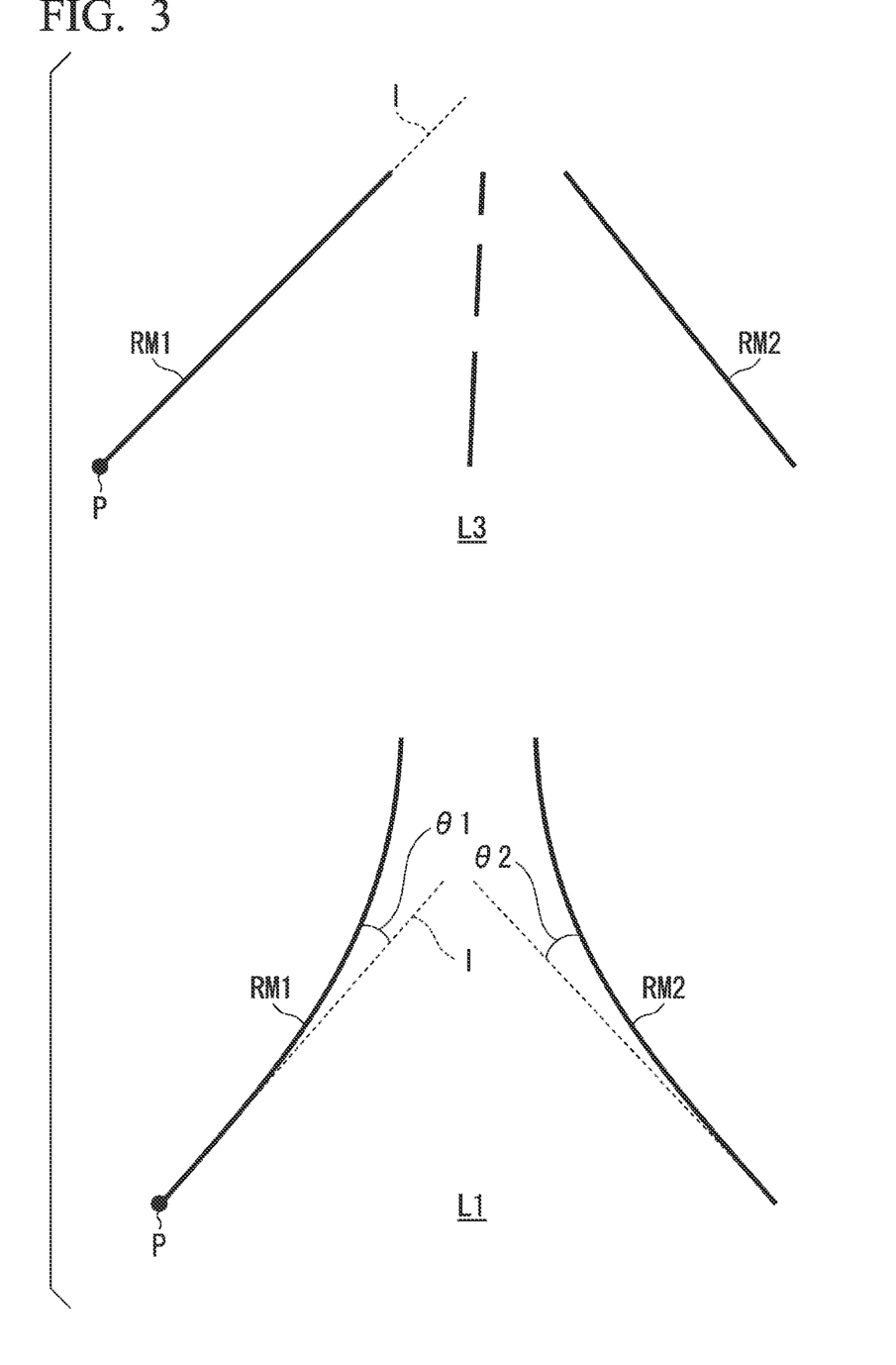
FIG. 3 is a diagram illustrating a method of detecting an uphill section in a traveling direction of the own vehicle using a camera.

FIG. 3 is a diagram illustrating a method of detecting an uphill section in a traveling direction of the own vehicle M using the camera 10. The upper portion of FIG. 3 shows the left road marking line RM1 and the right road marking line RM2 detected by the camera 10 when the own vehicle M is traveling in a flat lane L3. The lower portion of FIG. 3 shows the left road marking line RM1 and the right road marking line RM2 detected by the camera 10 when the own vehicle M is traveling in a lane L1 which is an underpass. A dotted line 1 indicates a straight line passing through a start point P of the detected road marking line RM and coming into contact with the road marking lines RM.

As shown in the upper portion of FIG. 3, when the own vehicle M is traveling in the flat lane L3, an angle formed between the road marking line RM and the dotted line 1 is zero, that is, the road marking line RM and the dotted line 1 are aligned. On the other hand, when the own vehicle M is traveling in the lane L1 which is an underpass, an angle θ of the road marking line RM at which the dotted line 1 is a reference line is a positive angle. Therefore, the underpass determination unit 120 can determine that the own vehicle M is traveling in the underpass when the angle formed between the reference line 1 and one of the left road marking line RM1 and the right road marking line RM2 imaged by the camera 10 is equal to or greater than a threshold.

The method of determining an underpass based on the shapes of the road marking lines RM captured by the camera 10 is not limited to the foregoing method. In general, as long as the shapes of the road marking lines RM are inward convex, the underpass determination unit 120 may determine that the own vehicle M is traveling in the underpass.

When a detection result of the radar device 12 indicates an uphill section, the underpass determination unit 120 determines that the own vehicle M is traveling in the underpass. FIG. 4 is a diagram illustrating a method of detecting an uphill section in a traveling direction of the own vehicle M using the radar device 12. An upper portion of FIG. 4 shows an aspect in which the radar device 12 radiates radio waves RW when the own vehicle M is traveling in the flat lane L3. A lower portion of FIG. 4 shows an aspect in which the radar device 12 radiates a radio wave RW1 when the own vehicle M is traveling in the lane L1 which is an underpass.

Figure 4:
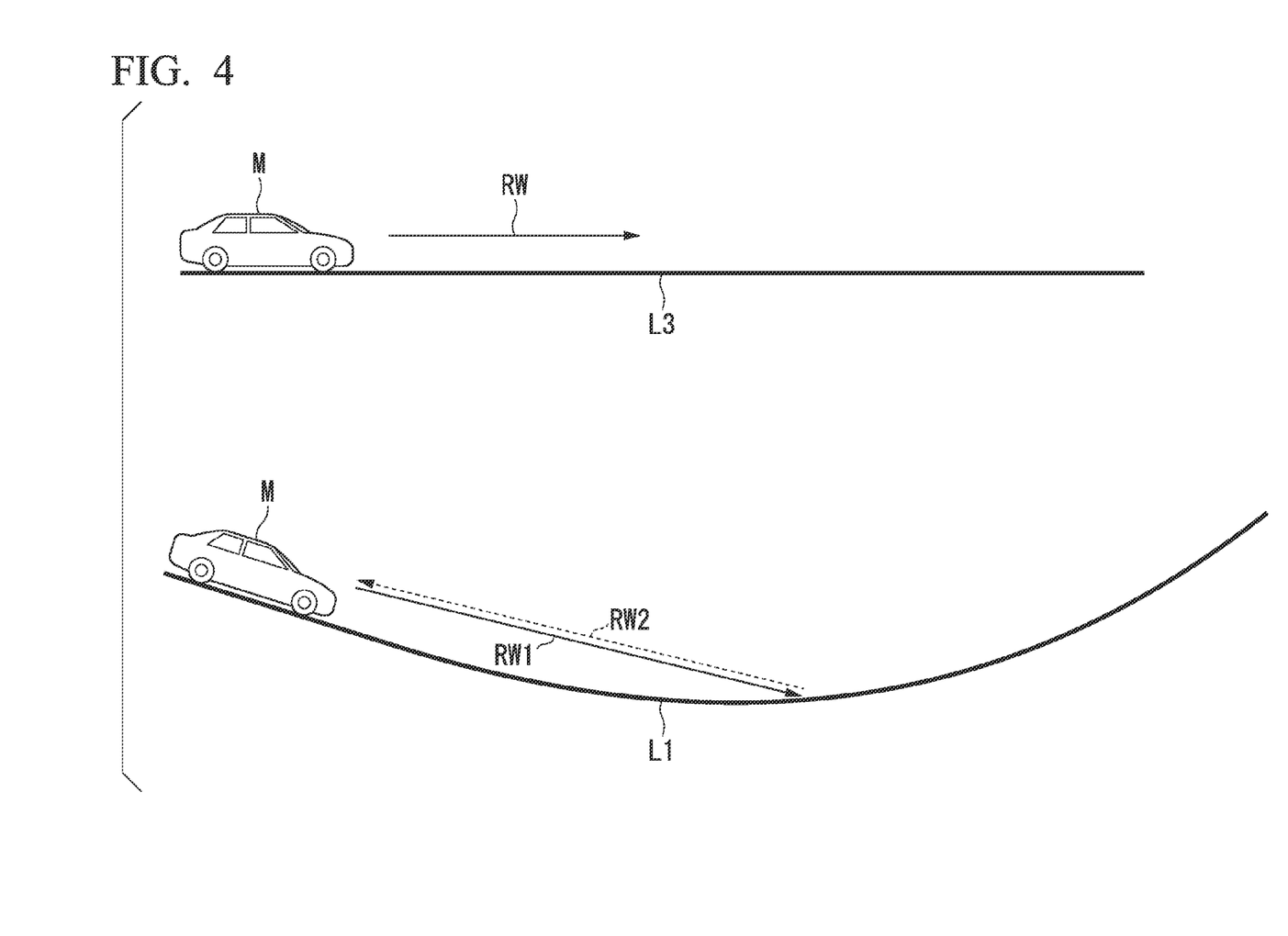
FIG. 4 is a diagram illustrating a method of detecting an uphill section in a traveling direction of the own vehicle using a radar device.

As shown in the upper portion of FIG. 4, when the own vehicle M is traveling in the flat lane L3, a reflection intensity measured by the radar device 12 is small because of no obstacle being present in the horizontal direction from the own vehicle M. On the other hand, as shown in the lower portion of FIG. 4, when the own vehicle M is traveling in the lane L1 which is an underpass, a reflection intensity of a reflected wave RW2 measured by the radar device 12 is large because of presence of the lane L1 as an obstacle in the horizontal direction from the own vehicle M. As a result, a reflection intensity distribution generated by the radar device 12 indicates a distinctive shape of the underpass, and thus the underpass determination unit 120 can determine that the own vehicle M is traveling in the underpass.

Third Determination Method for Underpass

As a third determination method for an underpass, based on the map information 130A and positional information of the own vehicle M, the underpass determination unit 120 determines whether the own vehicle M is traveling in the underpass. Specifically, for example, when the position of the own vehicle M indicates the underpass with reference to the map information 130A based on the position of the own vehicle M specified by an GNSS receiver, the underpass determination unit 120 determines that the own vehicle M is traveling in the underpass.

Flow of Operation of Underpass Determination Unit 120

Figure 5:
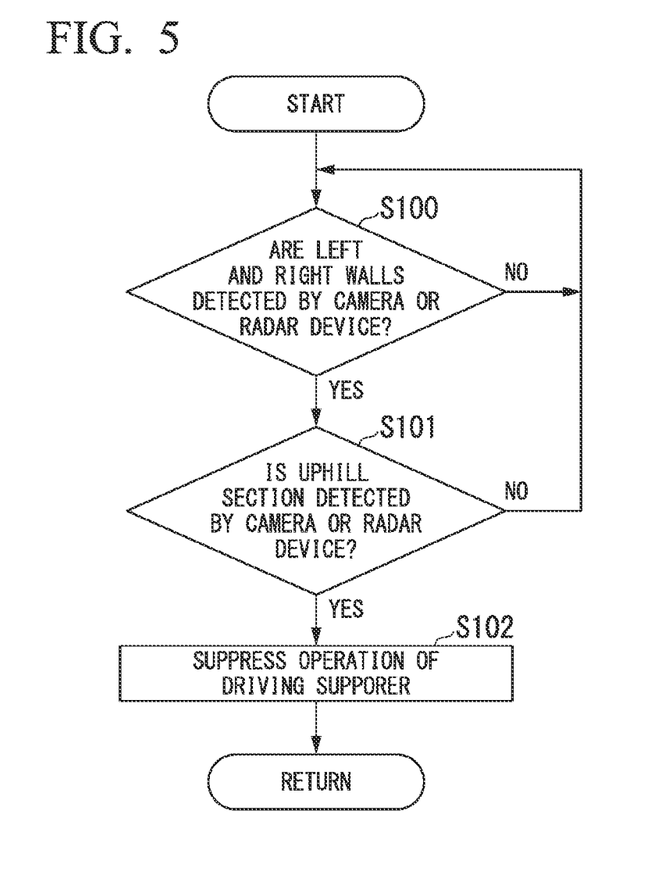
FIG. 5 is a flowchart illustrating an exemplary flow of a process performed by an underpass determination unit.

Next, a flow of a process performed by the underpass determination unit 120 will be described with reference to FIG. 5. FIG. 5 is a flowchart illustrating an exemplary flow of a process performed by the underpass determination unit 120. The process of the flowchart is performed at a predetermined cycle while the own vehicle M is traveling.

First, the underpass determination unit 120 determines whether at least one of the camera 10 and the radar device 12 detects the left and right walls in the traveling direction of the own vehicle M (step S100). When the underpass determination unit 120 determines that the left and right walls in the traveling direction of the own vehicle M are not detected, the underpass determination unit 120 performs the process of step S100 again. Conversely, when the underpass determination unit 120 determines that the left and right walls in the traveling direction of the own vehicle M are detected, the underpass determination unit 120 subsequently determines whether at least one of the camera 10 and the radar device 12 detects an uphill section in the traveling direction of the own vehicle M (step S101). When the underpass determination unit 120 determines that the uphill section in the traveling direction of the own vehicle M is not detected, the underpass determination unit 120 performs the process of step S100 again. Conversely, when underpass determination unit 120 determines that the uphill section in the traveling direction of the own vehicle M is detected, the underpass determination unit 120 determines that the own vehicle M is traveling in the underpass and suppresses the operation of the driving support unit 110 (step S102). Then, the process of the flowchart ends.

In the foregoing flowchart, the determination of step S101 is performed after the determination of step S100 is performed, but this order may be opposite. In the foregoing flowchart, when the determination of step S100 and the determination of step S101 are positive together, it is determined that the own vehicle M is traveling in the underpass. However, alternatively, when only one determination is positive, it may be determined that the own vehicle M is traveling in the underpass. Further, in the foregoing flowchart, the determination of the underpass using the map information 130A is not performed. However, the determination of the underpass using the map information 130A may be performed at a timing before or after the determination of step S100 and the determination of step S101.

When the underpass determination unit 120 determines that the own vehicle M is traveling in the underpass, the driving support unit 110 suppresses the operation of the driving support. More specifically, when the camera 10 detects an object during the suppression of the operation of the driving support, the driving support unit 110 estimates the size of the object based on a detection result of the radar device 12. When the size is equal to or less than a predetermined value, the driving support is not operated. In this case, the predetermined value is set to, for example, a size of a general vehicle. That is, when it is assumed based on the size of an estimated object that the object is a vehicle, the driving support unit 110 operates the driving support. In the case of the above-described comparative example, a vehicle that has a driving support function does not estimate the size of a recognized object. Therefore, the shadow SH of FIG. 2 may be mistaken as another vehicle and the driving support may be operated. However, the driving support unit 110 according to the embodiment estimates the size of an object and then determines an operation of the driving support. Therefore, it is possible to reduce an operation of the driving support based on erroneous recognition.

Further, when an object detected by the camera 10 is not a vehicle, the driving support unit 110 does not operate the driving support during the suppression of the operation of the driving support. This is because that an object present in the underpass is generally assumed to be a vehicle. Thus, it is possible to reduce the operation of the driving support based on erroneous recognition while the own vehicle M is traveling in the underpass more accurately.

Figure 6:
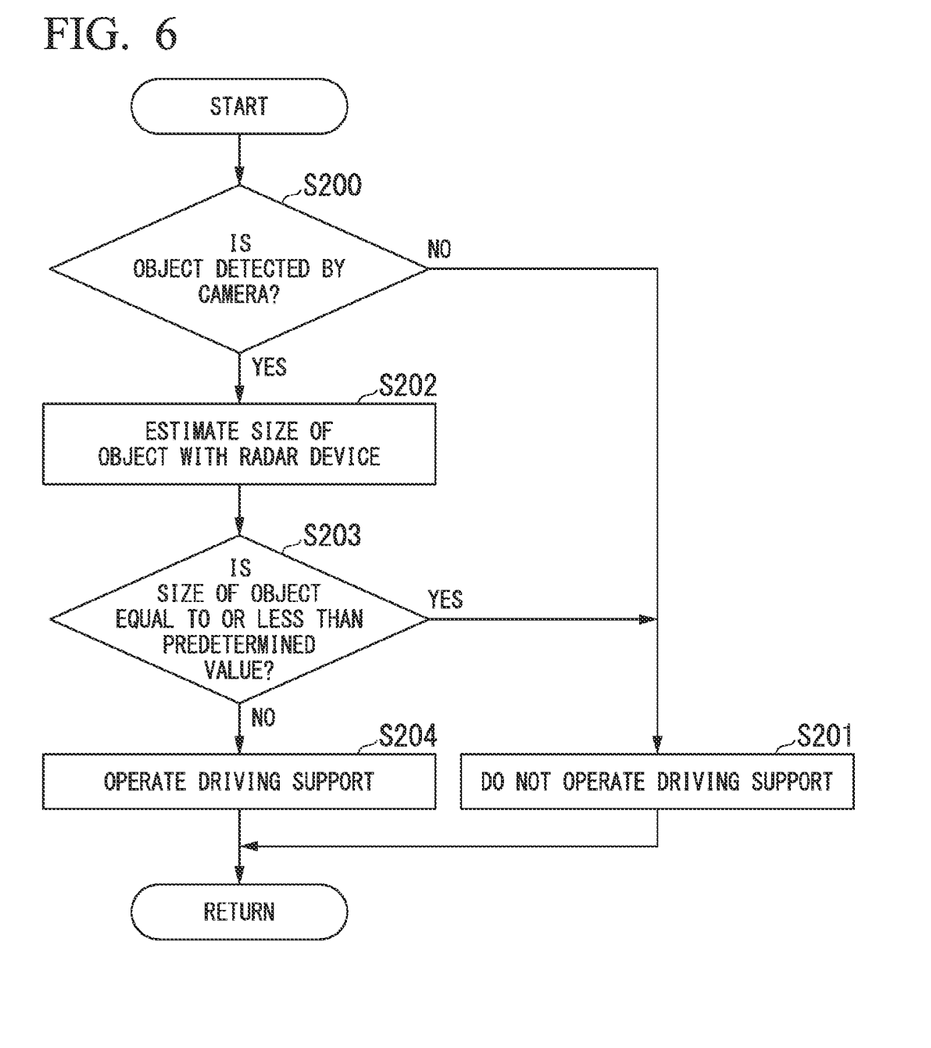
FIG. 6 is a flowchart illustrating an exemplary flow of a process performed by a driving support unit.

Next, a flow of a process performed by the driving support unit 110 will be described with reference to FIG. 6. FIG. 6 is a flowchart illustrating an exemplary flow of a process performed by the driving support unit 110. The process of the flowchart is performed when the underpass determination unit 120 determines that the own vehicle M is traveling in the underpass.

First, the driving support unit 110 determines whether the camera 10 detects an object (step S200). When the driving support unit 110 determines that an object is not detected by the camera 10, the driving support unit 110 does not operate the driving support (step S201) and ends the process of the flowchart.

Conversely, when the driving support unit 110 determines that an object is detected by the camera 10, the driving support unit 110 subsequently estimates the size of another vehicle based on a detection result of the radar device 12 (step S202). Subsequently, the driving support unit 110 determines whether the estimated size of the other vehicle is equal to or less than a predetermined value (step S203). When the driving support unit 110 determines that the estimated size of the object is equal to or less than the predetermined value, the driving support unit 110 does not operate the driving support. Conversely, when the driving support unit 110 determines that the estimated size of the object is greater than the predetermined value, the driving support unit 110 operates the driving support (step S204). Then, the process of the flowchart ends.

According to the above-described embodiment, the underpass determination unit 120 determines whether the own vehicle M is traveling in the underpass. When it is determined that the own vehicle M is traveling in the underpass, the driving support unit 110 suppresses the operation of the driving support. Thus, it is possible to reduce the operation of the driving support based on erroneous recognition of an object when a vehicle is traveling in an underpass which is a traffic route configured so that the vehicle is able to pass under an overlying structure.

The above-described embodiments can be expressed as follows.

A driving support device including:
a storage device storing a program; and
a hardware processor,
wherein the hardware processor executes the program stored in the storage device
to perform driving support of a vehicle based on a detection result of at least one of a radar device and an imaging device mounted in the vehicle,
to determine whether the vehicle is traveling in an underpass which is a traffic route along which the vehicle is able to pass under an overlying structure, and
to suppress an operation of the driving support when the vehicle is determined to be traveling under the underpass.

The embodiments for carrying out the present invention have been described above, but the present invention is not limited to the embodiments. Various modifications and substitutions can be made within the scope of the present invention without departing from the gist of the present invention.

What is claimed is:

1. A driving support device comprising:
a storage device storing a program; and
a hardware processor,
wherein the hardware processor executes the program stored in the storage device to:
perform driving support of a vehicle based on a detection result of at least one of a radar device and an imaging device mounted in the vehicle;
determine whether the vehicle is traveling in an underpass which is a traffic route along which the vehicle is able to pass under an overlying structure; and
suppress an operation of the driving support when the vehicle is determined to be traveling under the underpass.

2. The driving support device according to claim 1, wherein the hardware processor determines whether the vehicle is traveling in the underpass or not based on a detection result of at least one of the radar device and the imaging device.

3. The driving support device according to claim 2, wherein the hardware processor determines that the vehicle is traveling in the underpass when a condition that at least one of the radar device and the imaging device detects left and right walls in a traveling direction of the vehicle is satisfied.

4. The driving support device according to claim 2, wherein the hardware processor determines that the vehicle is traveling in the underpass when a condition that at least one of the radar device and the imaging device detects an uphill section in a traveling direction of the vehicle is satisfied.

5. The driving support device according to claim 1, wherein the hardware processor determines whether the vehicle is traveling in the underpass or not based on map information and positional information of the vehicle.

6. The driving support device according to claim 1, wherein the hardware processor estimates a size of an object based on a detection result of the radar device when the hardware processor determines that the vehicle is traveling in the underpass and the imaging device detects the object, and the hardware processor does not operate the driving support when the size is equal to or less than a predetermined value.

7. The driving support device according to claim 1, wherein, when the hardware processor determines that the vehicle is traveling in the underpass and an object detected by the imaging device is not a vehicle, the hardware processor does not operate the driving support.

8. A driving support method to be executed by a computer mounted in a vehicle, the driving support method comprising:
performing driving support of a vehicle based on a detection result of at least one of a radar device and an imaging device mounted in the vehicle;
determining whether the vehicle is traveling in an underpass which is a traffic route along which the vehicle is able to pass under an overlying structure; and
suppressing an operation of the driving support when the vehicle is determined to be traveling under the underpass.

9. A computer-readable non-transitory storage medium that stores a program for causing a computer mounted in a vehicle to:
perform driving support of a vehicle based on a detection result of at least one of a radar device and an imaging device mounted in the vehicle;
determine whether the vehicle is traveling in an underpass which is a traffic route along which the vehicle is able to pass under an overlying structure; and
suppress an operation of the driving support when the vehicle is determined to be traveling under the underpass.

* * * * *